(12) United States Patent
Sasaki et al.

(10) Patent No.: US 8,085,522 B2
(45) Date of Patent: Dec. 27, 2011

(54) CAPACITOR AND METHOD OF MANUFACTURING THE SAME AND CAPACITOR UNIT

(75) Inventors: Yoshitaka Sasaki, Santa Clara, CA (US); Tatsushi Shimizu, Shatin, N.T. (CA); Takehiro Horinaka, Milpitas, CA (US); Kazuo Ishizaki, Milpitas, CA (US); Shigeki Tanemura, Santa Clara, CA (US)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 216 days.

(21) Appl. No.: 11/819,253

(22) Filed: Jun. 26, 2007

(65) Prior Publication Data

US 2009/0000093 A1    Jan. 1, 2009

(51) Int. Cl.
*H01G 4/005* (2006.01)
*H01G 4/06* (2006.01)
(52) U.S. Cl. ............... 361/303; 361/311; 29/25.42
(58) Field of Classification Search .......... 361/303–305, 361/311; 29/25.42
See application file for complete search history.

(56) References Cited

U.S. PATENT DOCUMENTS

| 3,964,315 | A | * | 6/1976 | Engelhardt | 374/152 |
|---|---|---|---|---|---|
| 5,956,224 | A | * | 9/1999 | Jeon | 361/303 |
| 6,043,973 | A | * | 3/2000 | Nagashima et al. | 361/305 |
| 6,075,691 | A | * | 6/2000 | Duenas et al. | 361/321.5 |
| 6,326,052 | B1 | * | 12/2001 | Nagashima et al. | 427/79 |
| 6,407,929 | B1 | * | 6/2002 | Hale et al. | 361/763 |
| 6,452,776 | B1 | * | 9/2002 | Chakravorty | 361/303 |
| 6,542,351 | B1 | * | 4/2003 | Kwang | 361/303 |
| 6,559,004 | B1 | * | 5/2003 | Yang et al. | 438/253 |
| 6,706,589 | B2 | * | 3/2004 | Arnal et al. | 438/253 |
| 2003/0183862 | A1 | * | 10/2003 | Jin et al. | 257/301 |
| 2003/0199139 | A1 | * | 10/2003 | Lee | 438/240 |
| 2005/0174722 | A1 | * | 8/2005 | Hiranaka et al. | 361/600 |
| 2006/0042832 | A1 | * | 3/2006 | Sato et al. | 174/264 |
| 2006/0221544 | A1 | * | 10/2006 | Lee | 361/303 |
| 2006/0286369 | A1 | * | 12/2006 | Tanaka et al. | 428/332 |
| 2008/0127470 | A1 | * | 6/2008 | Tanaka | 29/25.03 |

FOREIGN PATENT DOCUMENTS

JP        09120909 A    *    5/1997

* cited by examiner

*Primary Examiner* — Eric Thomas
(74) *Attorney, Agent, or Firm* — Oliff & Berridge, PLC

(57) ABSTRACT

The present invention has a configuration which allows manufacturing a capacitor including a first electrode layer, conductive first convex sections layered on a surface of the first electrode layer, a first dielectric layer formed on a surface of the first convex sections and a surface of the first electrode layer, and a second electrode layer formed so as to be superimposed on the first convex sections and the first electrode layer via the first dielectric layer.

29 Claims, 15 Drawing Sheets

CAPACITOR AND METHOD OF MANUFACTURING THE SAME AND CAPACITOR UNIT

BACKGROUND OF THE INVENTION

1. Field of the Invention

The present invention relates to a capacitor unit, that is, a passive element for holding or discharging electric charges by electrostatic capacitance, and a method of manufacturing the same and a capacitor unit.

2. Related Background Art

As electronic equipment becomes more precise, a decrease in size and an increase in capacity are strongly demanded for capacitors, including the chip capacitors used for electronic equipment. Lately the development of technology to enable a decrease in size and an increase in capacity by decreasing the thickness of the layers and increasing the number of layers of a chip capacitor, and by implementing a super-fine structure at the particle size level, is ongoing.

For DRAM as well, size is decreasing and capacity is increasing along with the subdivision of DRAM cells. An available method of manufacturing a DRAM cell is forming a gate trench in a p-type silicon substrate in an NMOS transistor region, forming an insulation film on an inner wall face of the gate trench, and forming a gate electrode thereon.

SUMMARY OF THE INVENTION

It is difficult to apply the manufacturing technology for a DRAM cell to a chip capacitor since insulation film is formed on the p-type silicon substrate. Also in the case of a DRAM cell, a gate trench is formed on the p-type silicon substrate and then an insulation film is formed, so even if this technology were used for forming a dielectric layer, the depth of the gate trench would depend on the thickness of the substrate, therefore securing the desired electrostatic capacitance would be difficult.

With the foregoing in view, it is an object of the present invention to provide a capacitor which can easily secure a desired electrostatic capacitance, and a method of manufacturing the same and a capacitor unit.

To solve the above problem, a capacitor according to the present invention comprises: a first electrode layer; conductive first convex sections layered on a surface of the first electrode layer; a first dielectric layer formed on a surface of the first convex sections and a surface of the first electrode layer; and a second electrode layer formed so as to be superimposed on the first convex sections and the first electrode layer via the first dielectric layer.

In this capacitor, the first convex sections are formed on the surface of the first electrode layer, and the dielectric layer is formed on the surfaced of the first convex sections and the surface of the first electrode layer. Therefore compared with a flat dielectric layer, the surface area of the dielectric layer increases. Also the first convex sections for forming the dielectric layer are layered on the surface of the first electrode layer, so it is easier to enlarge the surface area, and it is more advantageous to expand the electrostatic capacitance compared with the case of forming a trench. Also high frequency characteristics can be improved by expanding the electrostatic capacity.

It is preferable that the first dielectric layer is formed of at least one of $Al_2O_3$, $SiO_2$, titanium oxide, SiC, tantalum oxide, hafnium oxide and $BaTiO_3$.

It is also preferable that the first dielectric layer has a multilayer structure including a Ta film and an anodic oxide film formed on the Ta film.

It is also preferable that the capacitor of the present invention further comprises: conductive second convex sections layered on a surface of the second electrode layer; a second dielectric layer formed on a surface of the second convex sections and a surface of the second electrode layer; and a third electrode layer formed so as to be superimposed on the second convex sections and the second electrode layer via the second dielectric layer. With this configuration, the dielectric layers can be superimposed, so electrostatic capacity can be increased by a multilayer structure.

It is also suitable that at least one of the first dielectric layer and the second dielectric layer is formed of at least one of $Al_2O_3$, $SiO_2$, titanium oxide, SiC, tantalum oxide, hafnium oxide and $BaTiO_3$.

It is also preferable that at least one of the first dielectric layer and the second dielectric layer has a multilayer structure including a Ta film and an anodic oxide film formed on the Ta film.

The present invention also provides a method of manufacturing a capacitor, comprising the following steps (1) to (4),
(1) step of forming a first dielectric layer,
(2) step of forming first convex sections by layering a conductive material on a surface of the first electrode layer,
(3) step of forming a first dielectric layer by forming an insulation film on a surface of the first convex sections and a surface of the first electrode layer, and
(4) step of forming a second electrode layer by layering a conductive material so as to be superimposed on the first convex sections and the first electrode layer via the first dielectric layer.

According to this method of manufacturing a capacitor, the first convex sections are formed on the surface of the first electrode layer, and the dielectric layer is formed on the surface of the first convex sections and the surface of the first electrode layer. Therefore compared with a flat dielectric layer, a capacitor of which the surface area of the dielectric layer is larger can be manufactured. Also in this method of manufacturing, the first convex sections for forming the dielectric layer are layered on the surface of the first electrode layer, so a capacitor that can more easily enlarge the surface area and is more advantageous to expand the electrostatic capacitance, compared with the case of forming a trench, can be manufactured. Also by expanding the electrostatic capacity, a capacitor having a better high frequency characteristic can be manufactured.

In the step of forming the first dielectric layer, it is preferable that the insulation film is formed by a CVD method or an atomic layer method.

It is also preferable that the insulation material is at least one of $Al_2O_3$, $SiO_2$, titanium oxide, SiC, tantalum oxide, hafnium oxide and $BaTiO_3$.

In the step of forming the first dielectric layer, it is preferable that a Ta film is formed on the surface of the first convex sections and the surface of the first electrode layer, and anodic oxidation is performed on the surface of the Ta film.

The present invention also provides a method of manufacturing a capacitor further comprising the following steps (5) to (7),
(5) step of forming second convex sections by layering a conductive material on a surface of the second electrode layer,
(6) step of forming a second dielectric layer by forming an insulation material on a surface of the second convex sections and a surface of the second electrode layer, and (7) step of forming a third electrode layer by layering a conductive material so as to be superimposed on the second convex sections and the second electrode layer via the second dielectric layer.

According to this method of manufacturing a capacitor, a capacitor of which dielectric layers are superimposed can be manufactured, and a capacitor of which electrostatic capacity can be easily expanded by a multilayer structure of a dielectric layer can be manufactured.

According to the method of manufacturing a capacitor, it is also preferable that the insulation film is formed by a CVD method or an atomic layer method in at least one of the step of forming the first dielectric layer and the step of forming the second dielectric layer.

It is also preferable that the insulation material is at least one of $Al_2O_3$, $SiO_2$, titanium oxide, SiC, tantalum oxide, hafnium oxide and $BaTiO_3$.

It is also preferable that a Ta film is formed on the surface of the first convex sections and the surface of the first electrode layer, and anodic oxidation is performed on the surface of the Ta film in at least one of the step of forming the first dielectric layer and the step of forming the second dielectric layer.

The present invention also provides a capacitor unit in which a bridge circuit is formed using a plurality of capacitors, wherein one capacitor out of the plurality of capacitors comprises: a first electrode layer; conductive first convex sections layered on a surface of the first electrode layer; a first dielectric layer formed on a surface of the first convex sections and a surface of the first electrode layer; and a second electrode layer formed so as to be superimposed on the first convex sections and the first electrode layer via the first dielectric layer.

In the capacitor used for this capacitor unit, the first convex sections are formed on the surface of the first electrode layer, and the dielectric layer is formed on the surface of the first convex sections and the surface of the first electrode layer. Therefore compared with a flat dielectric layer, the surface area of the dielectric layer increases. Also the first convex sections for forming the dielectric layer are layered on the surface of the first electrode layer, so it is easier to enlarge the surface area, and is more advantageous to expand the electrostatic capacitance compared with the case of forming a trench. Also the high frequency characteristics can be improved by expanding the electrostatic capacitance.

It is preferable that the first dielectric layer is formed of at least one of $Al_2O_3$, $SiO_2$, titanium oxide, SiC, tantalum oxide, hafnium oxide and $BaTiO_3$.

It is also preferable that the first dielectric layer has a multilayer structure including a Ta film and an anodic oxide film formed on the Ta film.

It is also preferable that this one capacitor further comprises: conductive second convex sections layered on a surface of the second electrode layer; a second dielectric layer formed on a surface of the second convex sections and a surface of the second electrode layer; and a third electrode layer formed so as to be superimposed on the second convex sections and the second electrode layer via the second dielectric layer. With this configuration, the dielectric layers can be superimposed, so electrostatic capacity can be increased by a multilayer structure.

It is also preferable that at least one of the first layer and the second dielectric layer is formed of at least one of $Al_2O_3$, $SiO_2$, titanium oxide, SiC, tantalum oxide, hafnium oxide and $BaTiO_3$.

It is also preferable that at least one of the first dielectric layer and the second dielectric layer has a multilayer structure including a Ta film and an anodic oxide film formed on the Ta film The present invention will be more fully understood from the detailed description given herein below and the accompanying drawings which are given by way of illustration only, and thus are not to be considered as limiting the present invention.

DESCRIPTION OF THE PREFERRED EMBODIMENTS

Embodiments of the present invention will now be described with reference to the drawings. The same elements are denoted with a same reference symbol, and redundant description is omitted.

(Structure of Capacitor)

Figure 1:
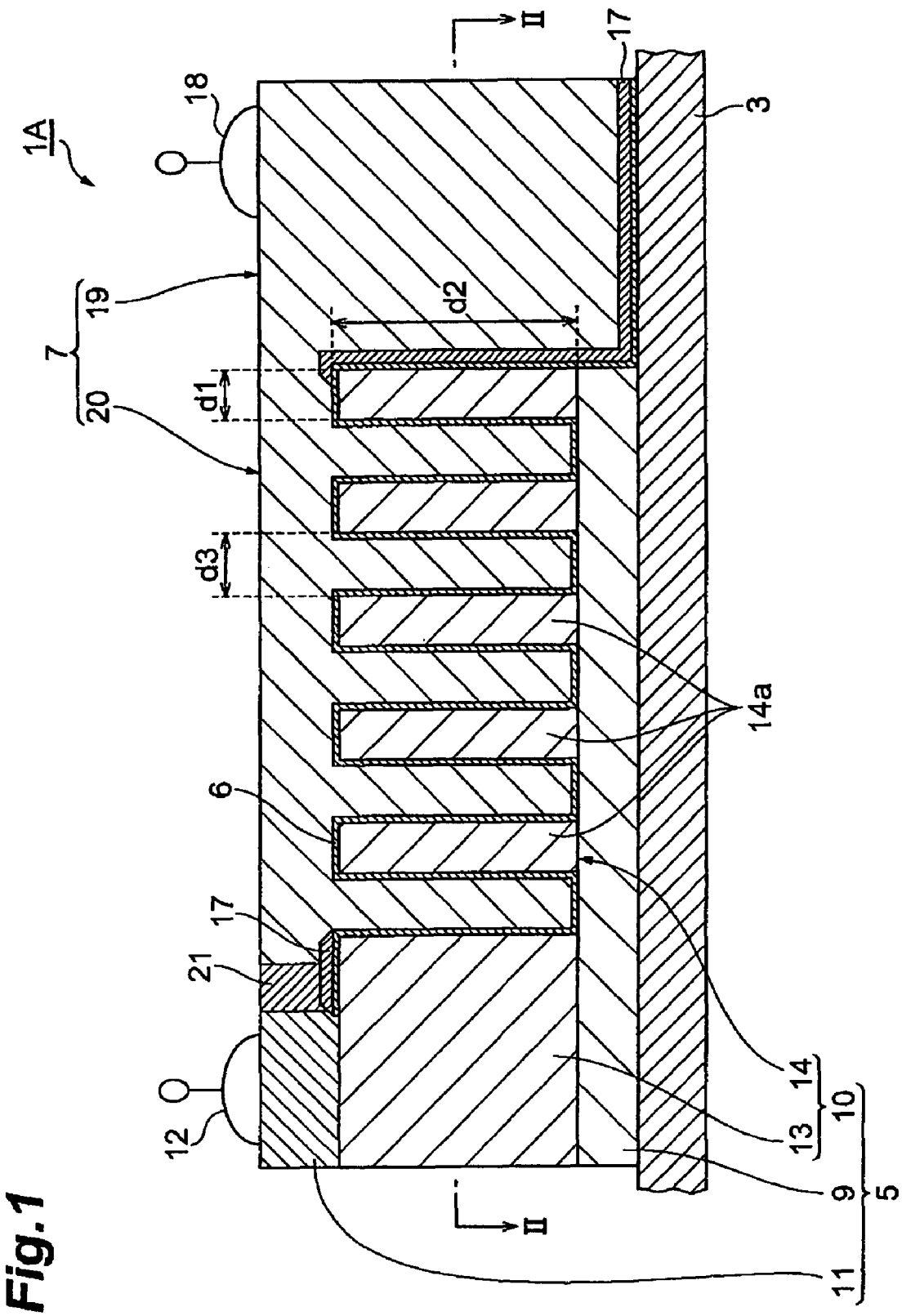
FIG. 1 is a cross-sectional view depicting the capacitor according to a first embodiment.
Figure 2:
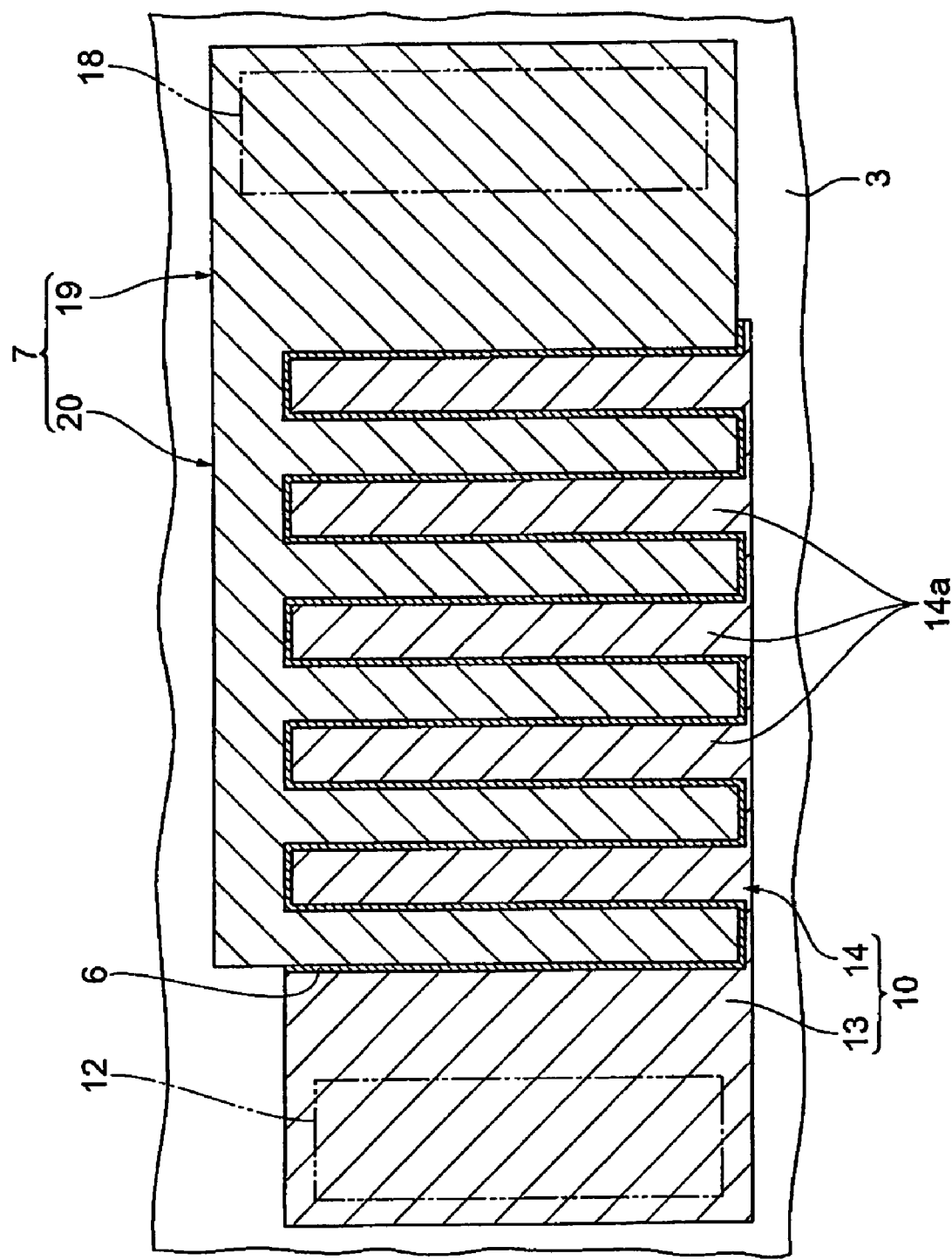
FIG. 2 is a cross-sectional view sectioned along the II-II line in FIG. 1.

Now a capacitor according to the first embodiment of the present invention will be described with reference to FIG. 1 and FIG. 2. FIG. 1 is a cross-sectional view of the capacitor according to the first embodiment, and FIG. 2 is a cross-sectional view sectioned along the II-II line in FIG. 1.

Capacitor 1A comprises a first electrode section 5 formed on a substrate 3, a dielectric layer 6 formed on a top face (surface) of the first electrode section 5, and a second electrode section 7 formed on top of the first electrode section 5 via the dielectric layer 6. The capacitor 1A is a passive element for storing and discharging the electric charges by the electrostatic capacitance of the dielectric layer 6.

The first electrode section 5 further comprises a bottom face electrode layer 9 layered on the flat substrate 3, an intermediate electrode layer 10 layered on the top face (surface) of the bottom face electrode layer 9, and an electrode pad connection section 11 formed on the top face of the intermediate electrode layer 10. The bottom face electrode layer 9 corresponds to the first electrode layer.

The bottom face electrode layer 9 is a film formed of a conductive metal material, such as Cu and Ni, and is formed by a plating method. The electrode pad connection section 11 is formed of a conductive metal material, such as Cu and Ni, and is formed at the edge of the top face of the intermediate electrode layer 10, and an electrode pad 12 is formed thereon.

The intermediate electrode layer 10 is formed of a conductive metal material, such as Cu and Ni, formed on the top face of the bottom face electrode layer 9, and further comprises a bottom current carrying area 13 connected to the electrode pad connection section 11, and a bottom convex-concave area 14 covered with the dielectric layer 6. On the bottom convex-concave area 14, a plurality of gaps 15 (see FIG. 3), where a part of the base electrode layer 9 is exposed, is formed, and the bottom convex-concave area 14 has a plurality of wall sections 14a which are vertically formed with the gaps 15 there between. The wall section 14a has a tapered shape where the top end is smaller than the bottom end. The wall section 14a corresponds to the first convex section.

On the side faces (surfaces) of the wall section 14a and on the top face (surface) of the bottom electrode layer 9 which is exposed at the bottom of the gaps 15, the dielectric layer 6 is formed as a film (insulation film) formed of an electrically insulated material, such as $Al_2O_3$. The dielectric layer 6 is also spread on a part of the bottom current carrying area 13 which is outside the bottom convex-concave area 14 and on the substrate 3, and an $Al_2O_3$ film 17 is formed on the top face of the dielectric layer 6 formed outside the bottom convex-concave area 14. For the dielectric layer 6, there may be an oxide film formed by oxidizing a conductive material, such as Cu and Ni. The insulation film as the dielectric layer 6 may be $SiO_2$, titanium oxide ($TiO_2$), SiC, tantalum oxide ($Ta_2O_5$), hafnium oxide ($HfO_2$) or $BaTiO_3$, for example, and hafnium oxide is particularly preferable. The dielectric layer 6 corresponds to the first dielectric layer.

The second electrode section 7 is formed of a conductive metal material, such as Cu and Ni, and is formed by a plating method. The second electrode section 7 further comprises a top current carrying area 19 where an electrode pad 18 is installed, and a top convex-concave area 20 arranged so as to be superimposed on the bottom convex-concave area 14. The second electrode section 7 corresponds to the second electrode layer.

The top current carrying area 19 is formed on the substrate 3 via the dielectric layer 6 and the $Al_2O_3$ film 17. The top convex-concave area 20 is formed so as to fill the gaps 15 formed in the bottom convex-concave area 14, and is also formed so as to be superimposed on the wall section 14a of the bottom convex-concave area 14 and the bottom electrode layer 9 via the convex-concave shaped dielectric layer 6.

In capacitor 1A, a plurality of wall sections 14a are formed on the top face of the bottom face electrode layer 9, and the dielectric layer 6 is formed on the side faces of the wall sections 14a and the top face of the bottom face electrode layer 9. The second electrode section 7 is formed so as to be superimposed on the wall sections 14a and the bottom electrode layer 9 via the dielectric layer 6. Therefore according to the capacitor 1A, the surface area of the dielectric layer 6 increases compared with a flat dielectric layer. Also the wall sections 14a are layered on the top face of the bottom face electrode layer 9, the surface area can be easily enlarged, which is advantageous to expand electrostatic capacitance compared with the case of forming trenches. The high frequency characteristics can also be improved by expansion of the electrostatic capacitance.

(Method of Manufacturing Capacitor)

Figure 3:
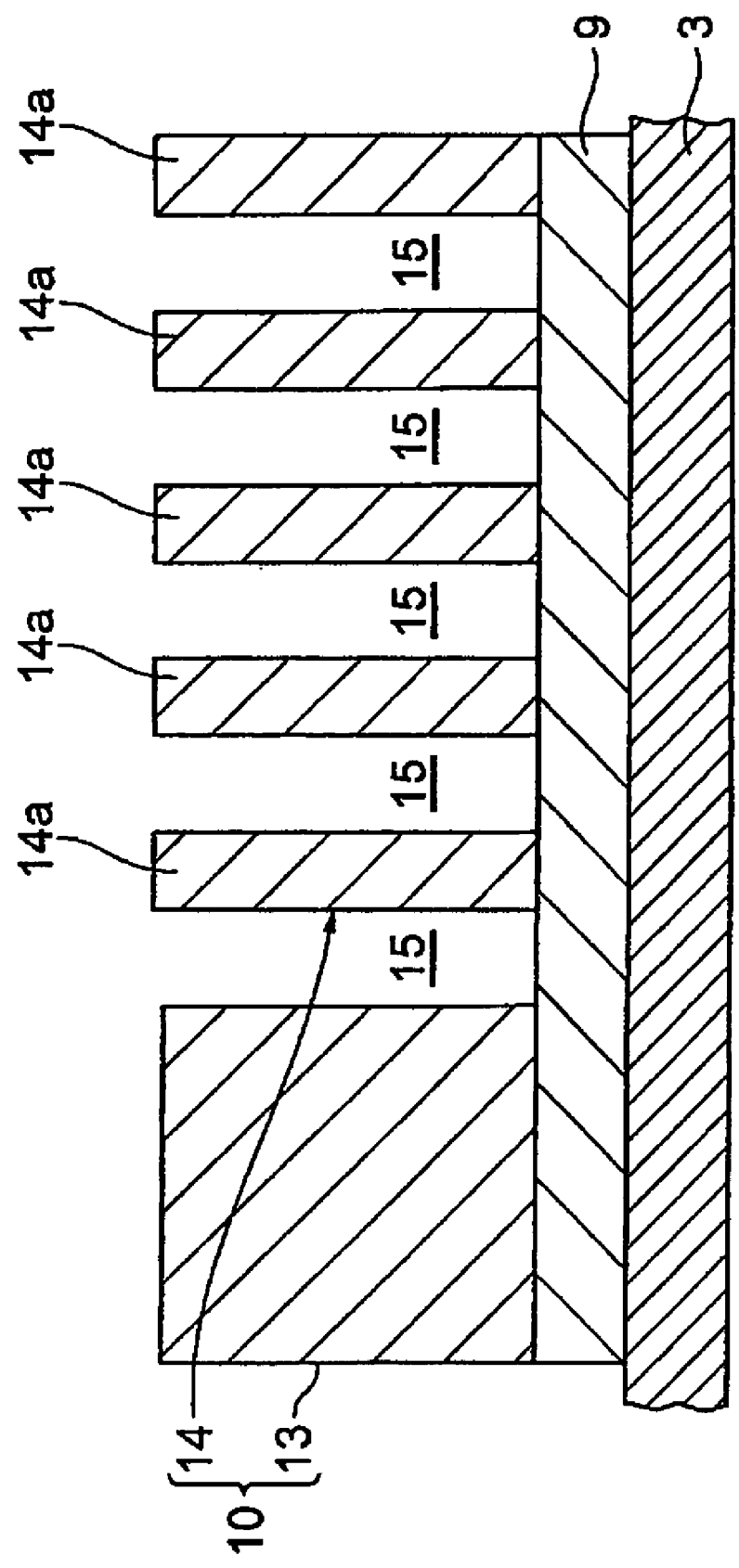
FIG. 3 is a cross-sectional view depicting a step of a method of manufacturing a capacitor according to the present invention.
Figure 4:
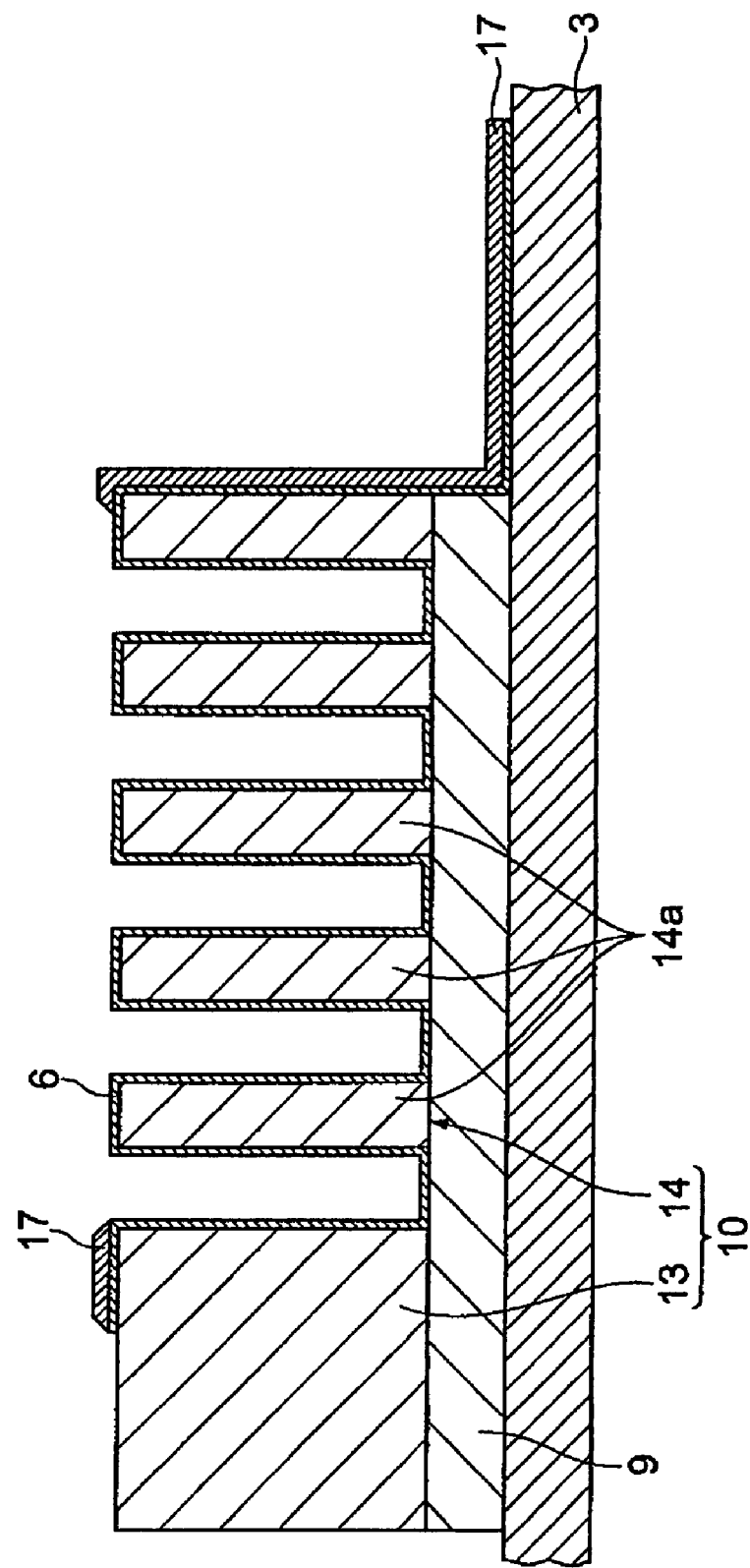
FIG. 4 is a cross-sectional view depicting the subsequent step of FIG. 3.
Figure 5:
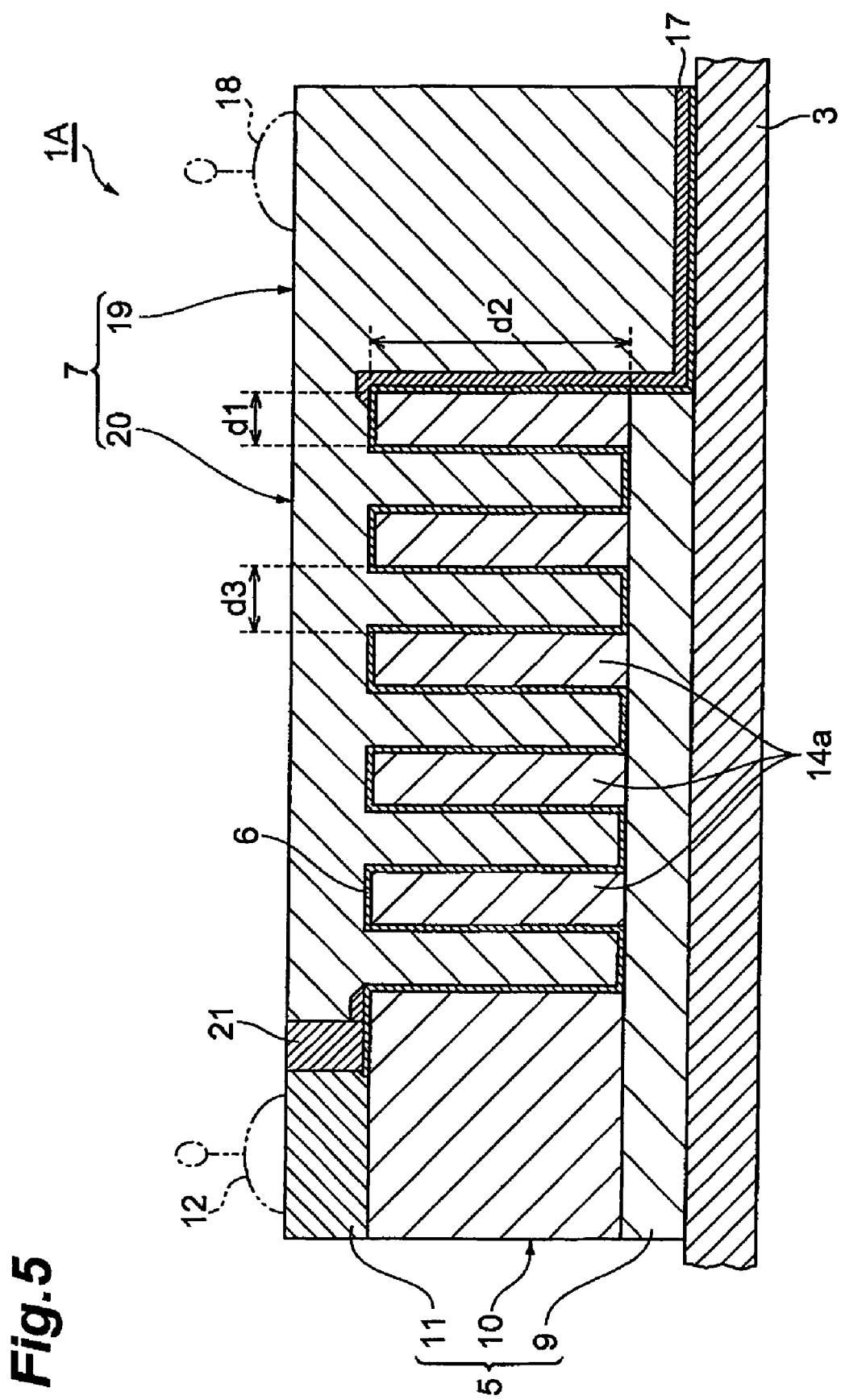
FIG. 5 is a cross-sectional view depicting the subsequent step of FIG. 4.

Now a method of manufacturing the capacitor 1A will be described with reference to FIG. 3 to FIG. 5. FIG. 3 to FIG. 5 are cross-sectional views depicting each step of the method of manufacturing.

In the method of manufacturing according to the present embodiment, a seed electrode layer, which is not illustrated, is formed on the substrate 3, as shown in FIG. 3, and the bottom face electrode layer 9, which is formed of Cu or Ni, for example, is formed on the substrate 3 by a plating method (first step). The first step corresponds to the step of forming the first electrode layer.

Then after coating photo-resist on the top face of the bottom face electrode layer 9, patterning is performed using a predetermined photo mask, and a resist pattern for exposing the top face of the bottom face electrode layer 9 in a predetermined shape corresponding to the intermediate electrode layer 10, such as a shape of the bottom convex-concave area 14, is formed. Using this resist pattern as a mask, a conductive metal material, such as Cu or Ni, is layered on the top face of the bottom face electrode layer 9 by a plating method so as to form the intermediate electrode layer 10 (second step). Particularly in the second step, a plurality of wall sections 14a of the bottom convex-concave area 14 are formed. The thickness d1 of the wall sections 14a formed in this case is about 1.5 µm, and the height d2 thereof is about 5.0 µm. The width d3 of the gap 15 between the adjacent wall sections 14a is about 2.0 µm. Then the resist pattern used for forming the intermediate electrode layer 10 is removed. The second step corresponds to the step of forming the first convex sections.

Then after coating photo-resist on the intermediate electrode layer 10, patterning is performed using a predetermined photo mask, and a resist pattern, for exposing a predetermined shape corresponding to the dielectric layer 6, is formed. Then the dielectric layer 6, which is a CVD-$Al_2O_3$ film, is formed to 300 to 1000 Å in an area which is not coated by the resist pattern by an atomic layer method, then the resist pattern is removed (third step). The insulation film as the dielectric layer 6 may also be formed by a CVD method. The insulation film as dielectric layer 6 may be $SiO_2$, titanium oxide ($TiO_2$), SiC, tantalum oxide ($Ta_2O_5$), hafnium oxide ($HfO_2$) or $BaTiO_3$, instead of $Al_2O_3$, and hafnium oxide is particularly preferable. The third step corresponds to a step of forming the first dielectric layer. After forming the dielectric layer 6, $Al_2O_3$ film 17 is formed in a predetermined area outside the intermediate electrode layer 10 by a sputtering method, then the resist pattern used for forming the $Al_2O_3$ film 17 is removed.

Then after forming the resist pattern for forming contact holes on the top face of the intermediate electrode layer 10, the contact holes are formed by IBE (Ion Beam Etching) (fourth step).

Then the seed electrode film (not illustrated) is formed on the dielectric layer 6 and the intermediate layer 10 and the $Al_2O_3$ film 17, which are spread outside the dielectric layer 6, by a sputtering method. Then after coating photo-resist on the seed electrode film, patterning is performed using a predetermined photo mask, and a resist pattern, for exposing a predetermined shape corresponding to the second electrode section 7, is formed. Then Cu or Ni, which is a conductive metal material, is layered on an area not coated by the resist pattern by a plating method so as to form a 5.0 to 7.0 μm thick second electrode section 7 (fifth step). The second electrode section 7 is formed so as to be superimposed on the wall sections 14a of the intermediate electrode layer 10 and the bottom face electrode layer 9 via the dielectric layer 6. The fifth step corresponds to the step of forming the second electrode layer.

By this layering, a conductive section is also formed on the top part of the bottom current carrying area 13 of the intermediate electrode layer 10, and the electrode pad connection section 11 is formed by this conductive section. The electrode pad connection section 11 is connected to the intermediate electrode layer 10 such that current can be carried. The electrode pad connection section 11 and the second electrode section 7 are insulated via the insulation film.

Then the electrode pad 12 is installed on the electrode pad connection section 11, and the electrode pad 18 is installed on the top current carrying area 19 of the second electrode section 7, thereby the capacitor 1A is manufactured.

By this method of manufacturing, the capacitor 1A, having a dielectric layer 6 of which surface area is larger than a flat dielectric layer, can be manufactured. Also according to this method of manufacturing, the wall sections 14a for forming the dielectric layer 6 are formed by forming a layer on the top face of the bottom face electrode layer 9, so the surface area can be easily enlarged compared with the case of forming trenches, and the capacitor 1A, which is advantageous to expand the electrostatic capacitance, can be manufactured. Also by expansion of electrostatic capacitance, the capacitor 1A, having good high frequency characteristics, can be manufactured.

Figure 7:
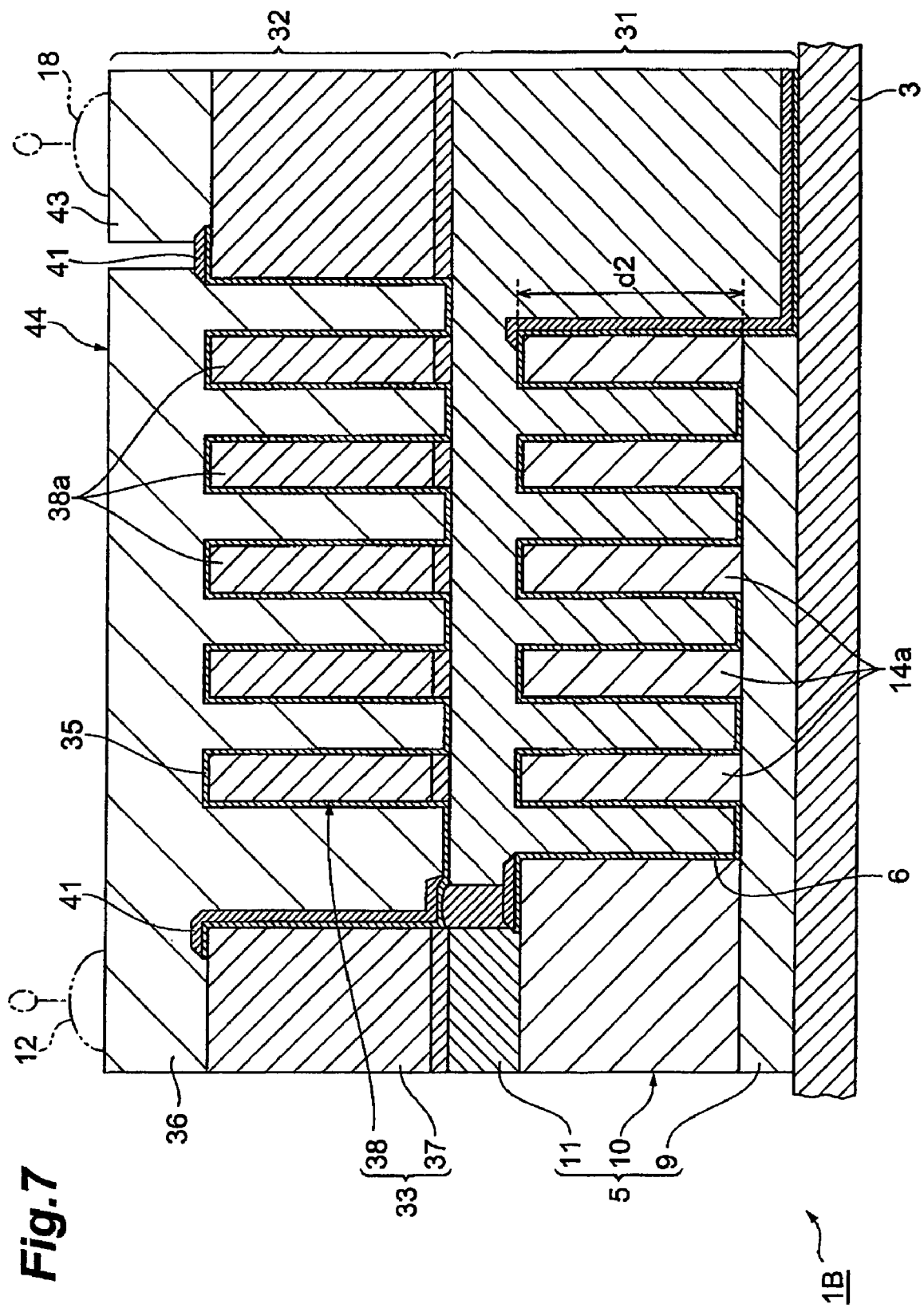
FIG. 7 is a cross-sectional view depicting the capacitor according to the second embodiment in the subsequent step of FIG. 6.

Now a capacitor according to the second embodiment of the present invention will be described with reference to FIG. 7. The capacitor 1B is separated into a bottom layer section 31 and a top layer section 32, and the bottom layer section 31 has a same configuration as the capacitor 1A of the first embodiment. Therefore for the bottom layer section 31, composing elements are denoted with the same reference symbols as capacitor 1A, and description thereof will be omitted.

The top layer section 32 comprises a third electrode section 33 formed on the top face of the second electrode section 7 of the bottom layer section 31, a dielectric layer 35 formed on a top face of the third electrode section 33, and a fourth electrode section 36 formed on top of the third electrode section 33 via the dielectric layer 35. The capacitor 1B is a passive element for storing and discharging electric charges by the electrostatic capacitance of the dielectric layer 6 of the bottom layer section 31 and the dielectric layer 35 of the top layer section 32. The capacitor 1B has a multilayer structure, which is implemented by forming the dielectric layer 35 in the top layer section 32, in addition to the dielectric layer 6 in the bottom layer section 31, so as to expand the electrostatic capacitance.

The third electrode section 33 is formed of a conductive metal material, such as Cu or Ni, layered on the top face of the second electrode section 7, and further comprises a bottom current carrying area 37 connected to the electrode pad connection section 11, and a bottom convex-concave area 38 covered with the dielectric layer 35. In the bottom convex-concave area 38, a plurality of gaps 39 (see FIG. 6), where a part of the second electrode section 10 is exposed, are formed, and the bottom convex-concave area 38 has a plurality of wall sections 38a which are vertically formed with the gaps 39 there between. A wall section 38a has a tapered shape where the top end is shorter than the bottom end. The wall section 38a corresponds to the second convex section.

An insulation film formed of an electrically insulated material, such as $Al_2O_3$, is formed as the dielectric layer 35 on the side faces (surface) of the wall sections 38a and on the top face (surface) of the second electrode section 7, which is exposed at the bottom of the gaps 39. The dielectric layer 35 is connected to the dielectric layer 6 via the $Al_2O_3$ film 21 formed in contact holes. The dielectric layer 35 is also spread outside the bottom convex-concave area 38, and an $Al_2O_3$ film 41 is formed on the top face of the top dielectric layer 6 of the bottom convex-concave area 38. The dielectric layer 35 may be formed by an oxide film that is oxidized conductive material, such as Cu or Ni. The insulation film as the dielectric layer 35 may be $SiO_2$, titanium oxide ($TiO_2$), SiC, tantalum oxide ($Ta_2O_5$), hafnium oxide ($HfO_2$) or $BaTiO_3$, for example, and hafnium oxide is particularly preferable. The dielectric layer 35 corresponds to the second dielectric layer.

The fourth electrode section 36 is formed of a conductive metal material, such as Cu and Ni, and is formed by a plating method. The fourth electrode section 36 further comprises a top current carrying area 43 provided with the electrode pad 18 and a top convex-concave area 44 arranged so as to be superimposed on the bottom convex-concave area 38. The fourth electrode section 36 corresponds to the third electrode layer.

The top convex-concave area 44 is formed so as to fill the gaps 39 formed in the bottom convex-concave area 38, and is arranged so as to be superimposed on the wall sections 38a of the bottom convex-concave area 38 and the second electrode section 7 via the convex-concave shaped dielectric layer 35.

According to this capacitor 1B, the dielectric layer 35 is also formed on the top layer section 32, in addition to the dielectric layer 6 of the bottom layer section 31, so the dielectric layer 6 and the dielectric layer 35 can be overlapped, and expansion of electrostatic capacitance can be implemented by a multilayer structure.

Figure 6:
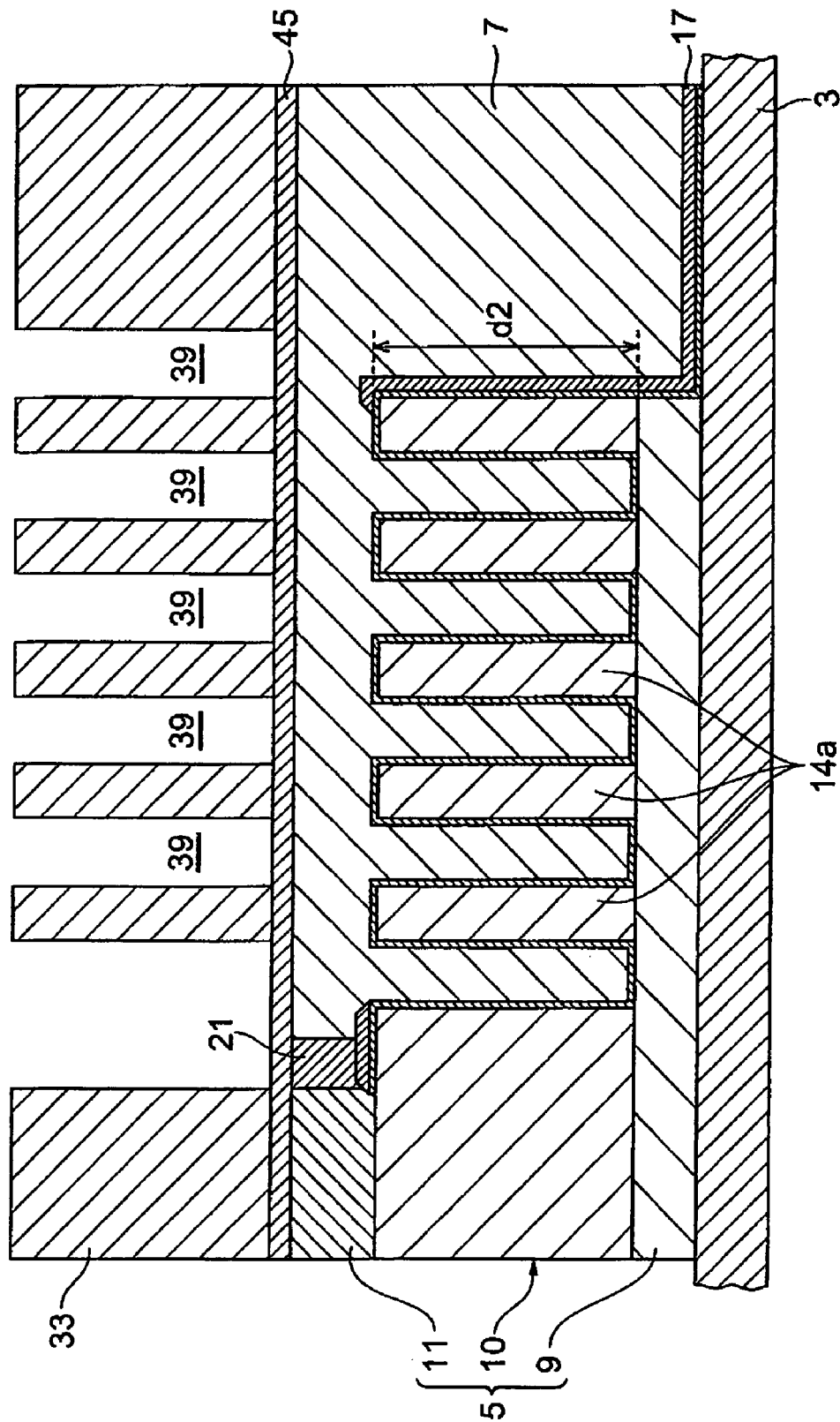
FIG. 6 is a cross-sectional view depicting a step of manufacturing steps for a capacitor according to a second embodiment.

Now a method of manufacturing the capacitor 1B according to the second embodiment will be described with reference to FIG. 6 and FIG. 7. FIG. 6 and FIG. 7 are cross-sectional views depicting each step of the method of manufacturing. The capacitor 1B is manufactured by other steps after the first to fifth steps, so the description on the first to fifth steps shown in FIG. 3 to FIG. 5 will be omitted.

After forming the second electrode section 7 (see FIG. 5), the seed electrode layer 45 is formed on the surface of the second electrode section 7 by a sputtering method, as shown in FIG. 6. Then after coating photo-resist on the seed electrode layer 45, patterning is performed using a predetermined photo mask, and a resist pattern, for exposing a predetermined shape corresponding to the third electrode section 33, is formed. Then a conductive metal material, such as Cu or Ni, is layered on the portion which is not coated with the resist pattern by a plating method, then the resist pattern is removed. Then as FIG. 7 shows, the seed electrode layer 45, exposed at the bottom of the gaps 39, is removed by IBE (sixth step). By this step, the bottom convex-concave area 38 of the third electrode section 33 is formed, and the plurality of wall sections 38a, layered on the top face of the second electrode section 7, are formed. The sixth step corresponds to the step of forming the second convex section.

Then the dielectric layer 35, which is a CVD-$Al_2O_3$ film, is formed for 300 to 1000 Å on the side faces (surface) of the wall sections 38a and the top face of the second electrode section 7, that is the top face of the bottom convex-concave area 38 by an atomic layer method (seventh step). The insulation film as the dielectric layer 35 may also be formed by a CVD method. The insulation film as the dielectric layer 35 may be $SiO_2$, titanium oxide ($TiO_2$), SiC, tantalum oxide ($Ta_2O_5$), hafnium oxide ($HfO_2$) or $BaTiO_3$, instead of $Al_2O_3$, and hafnium oxide is particularly preferable. After forming the dielectric layer 35, the $Al_2O_3$ film 41 is formed in a predetermined area by a sputtering method. The seventh step corresponds to the step of forming the second dielectric layer.

Then after forming the seed electrode layer by a sputtering method, patterning is performed on the top face of the dielectric layer 35 using a predetermined photo mask, and a resist pattern, for exposing a predetermined shape corresponding to the fourth electrode section 36, is formed. Then Cu or Ni, which is a conductive metal material, is coated on the part not coated by the resist pattern, and the fourth electrode 36 is formed (eighth step). The fourth electrode section 36 is formed so as to be superimposed on the wall sections 38a and the second electrode section 7. The eighth step corresponds to the step of forming the third electrode layer.

Then the electrode pad 12 is installed in the fourth electrode section 36, and the electrode pad 18 is installed in the third electrode section 33, thereby the capacitor 1B is manufactured.

By this method, the dielectric layer 35 can also be formed in the top layer section 32, in addition to the dielectric layer 6 in the bottom layer section 31, so that the dielectric layer 6 and the dielectric layer 35 are superimposed, and the capacitor 1B that can implemented expansion of electrostatic capacitance by the multilayer structure of the dielectric layer 6 and the dielectric layer 35 can be manufactured.

Now a method of manufacturing the capacitor 1C according to the third embodiment will be described with reference to FIG. 8 to FIG. 13. FIG. 8 to FIG. 13 are cross-sectional views depicting each step of the method of manufacturing.

Figure 8:
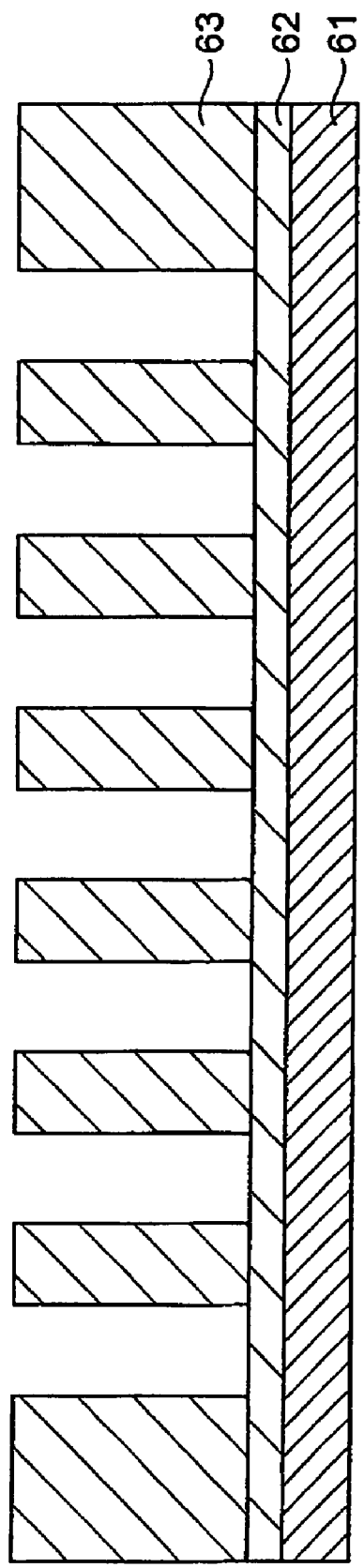
FIG. 8 is a cross-sectional view depicting a step of manufacturing steps of a capacitor according to a third embodiment.

In the method of manufacturing according to the present embodiment, the seed electrode layer, which is not illustrated, is formed on the substrate 61 as shown in FIG. 8, and the bottom face electrode layer 62 formed of Cu is formed on the substrate 61 by a plating method (first step). The first step corresponds to the step of forming the first electrode layer. Then after coating photo resist 63 on the top face of the bottom face electrode layer 62, patterning is performed using a predetermined photo mask, and a resist pattern for exposing a predetermined shape corresponding to the intermediate layer 65 is formed on the top face of the bottom face electrode layer 62.

Figure 9:
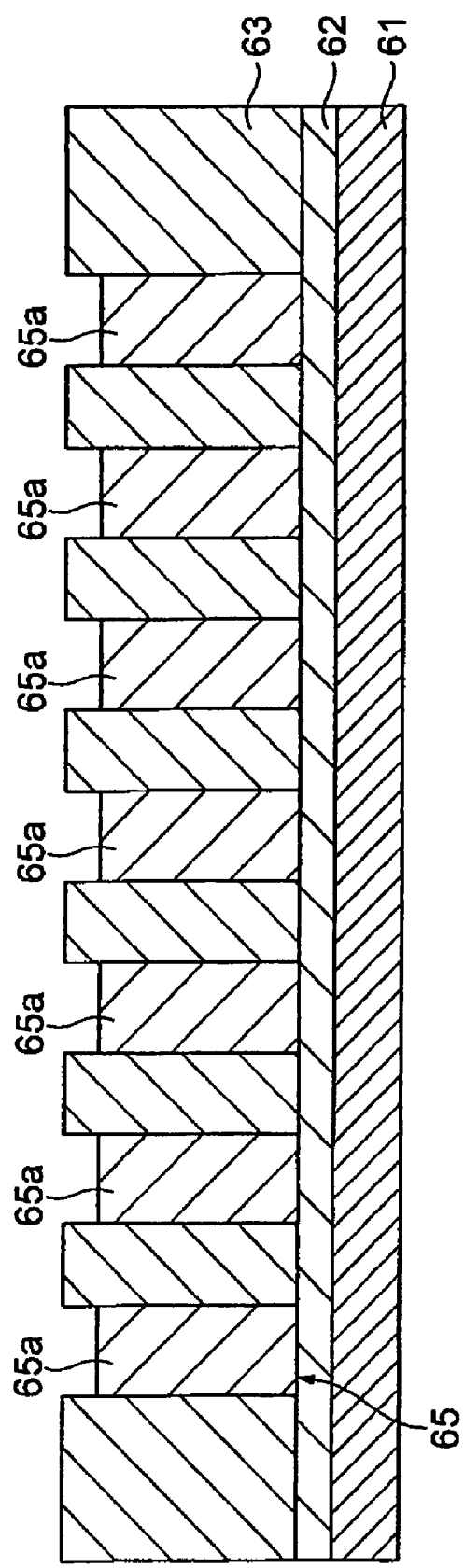
FIG. 9 is a cross-sectional view depicting the subsequent step of FIG. 8.
Figure 10:
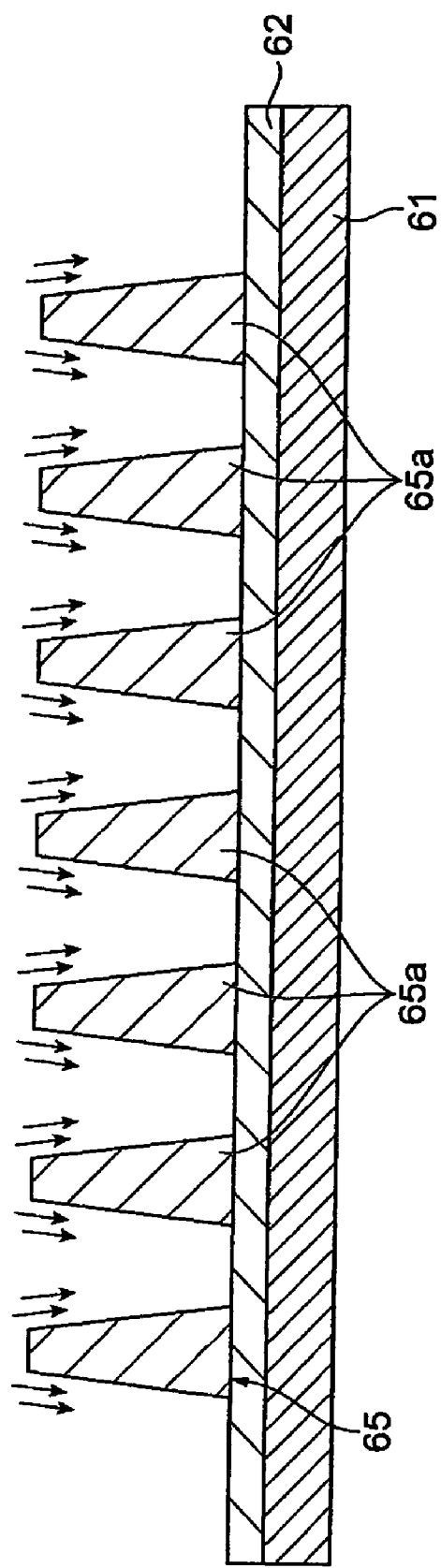
FIG. 10 is a cross-sectional view depicting the subsequent step of FIG. 9.

Then as FIG. 9 shows, a conductive metal material, such as Cu, is layered on the top face of the bottom face electrode layer 62 by a plating method, using the resist pattern as a mask, and the intermediate electrode layer 65 is formed (second step). Particularly in the second step, a plurality of wall sections 65a are formed for forming the convex-concave shape on the intermediate electrode layer 65. Then the resist pattern, used for forming the intermediate electrode layer 65, is removed. The wall section 65a corresponds to the first convex section. Then as FIG. 10 shows, IBE (Ion Beam Etching) is performed for tapering the plurality of wall sections 65a of the intermediate electrode layer 65 (third step). The second and third steps corresponds to the step of forming the first convex section.

Figure 11:
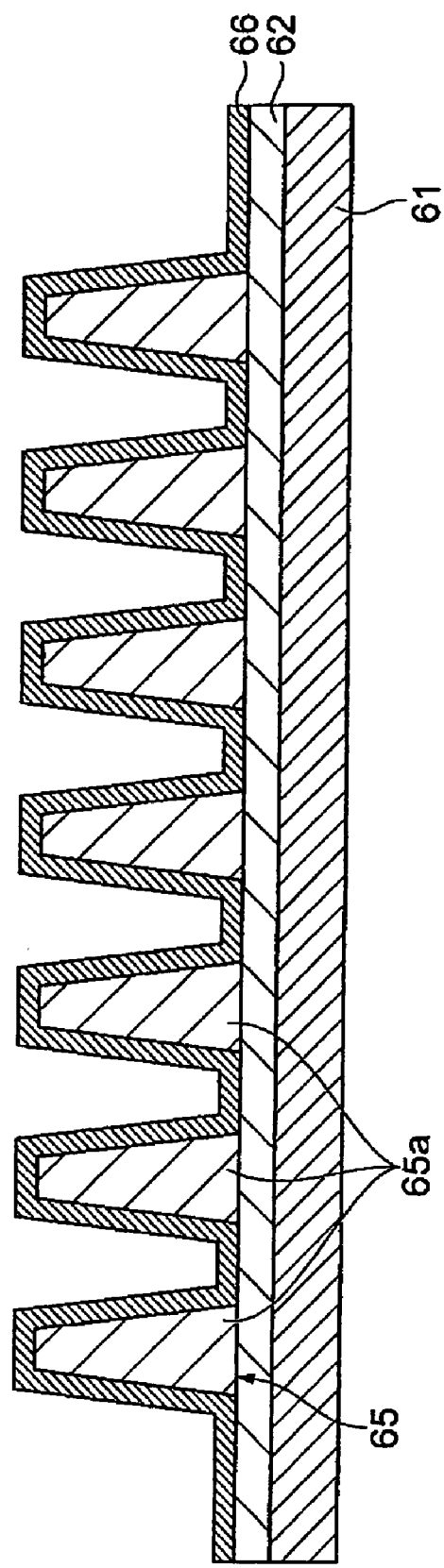
FIG. 11 is a cross-sectional view depicting the subsequent step of FIG. 10.
Figure 12:
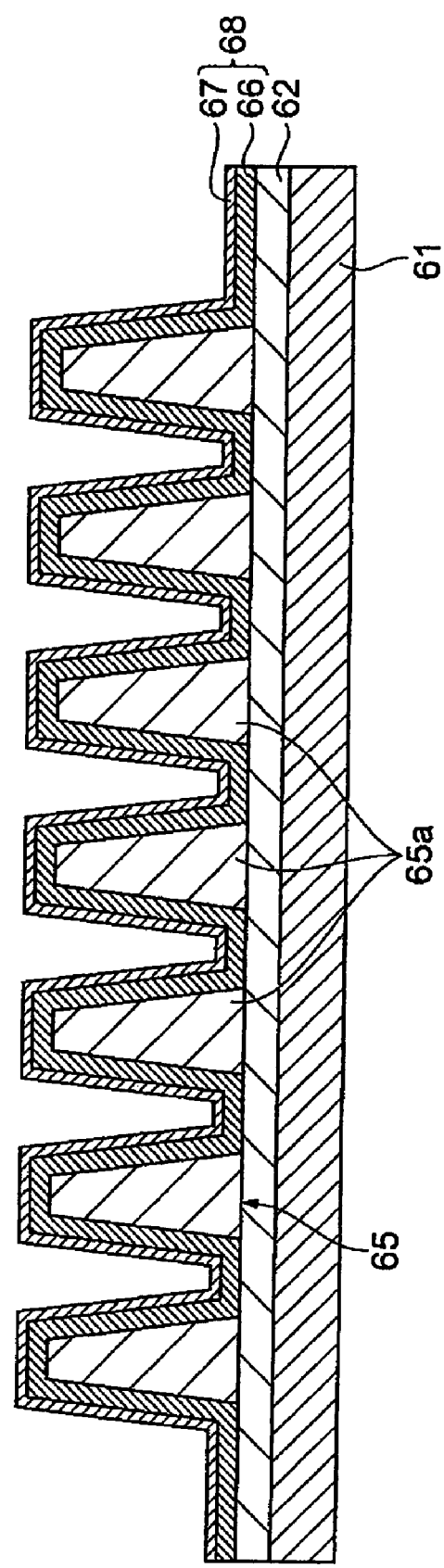
FIG. 12 is a cross-sectional view depicting the subsequent step of FIG. 11.
Figure 13:
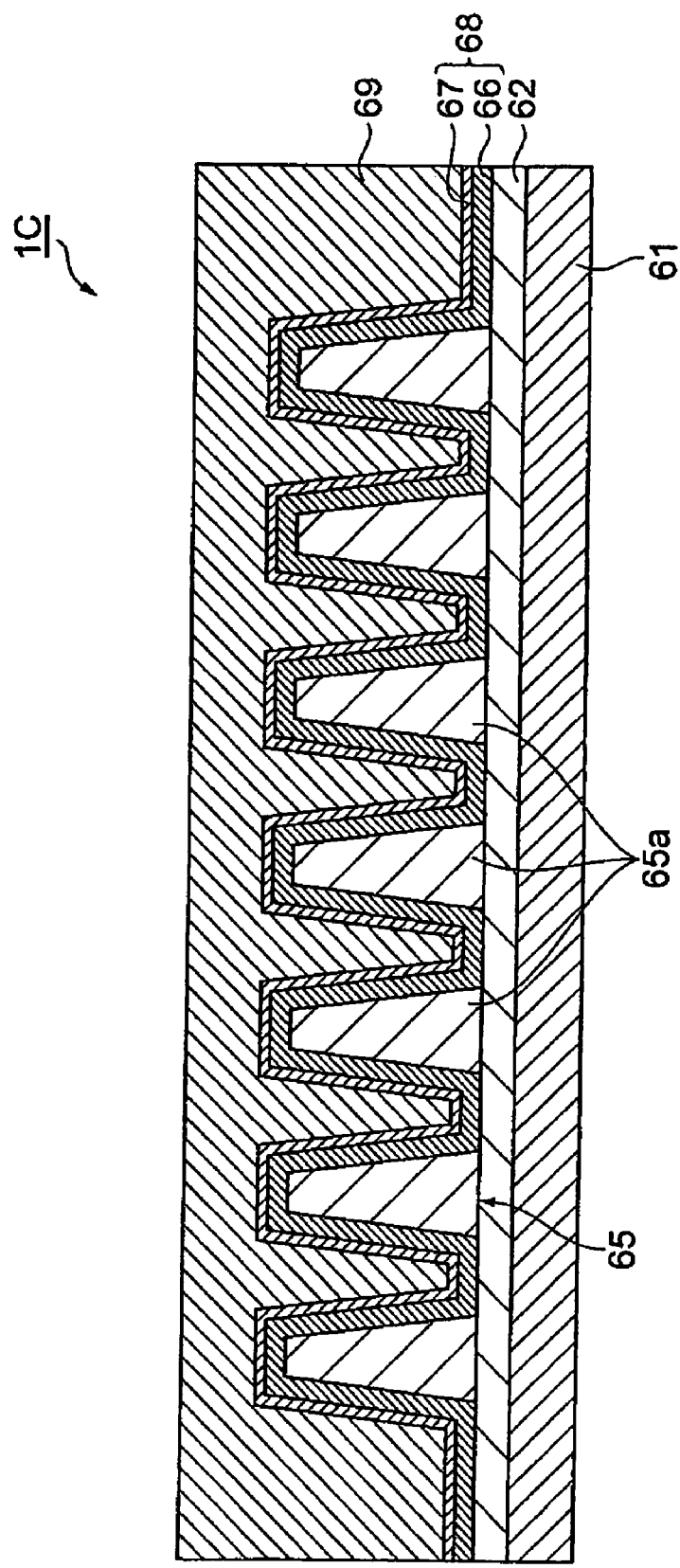
FIG. 13 is a cross-sectional view depicting the subsequent step of FIG. 12.

Then as FIG. 11 shows, about a 400 Å Ta film 66 is formed on the surface of the plurality of wall sections 65a of the intermediate electrode layer 65 and on the bottom face electrode layer 62 not covered with the wall sections 65a by an atomic layer method, and also as FIG. 12 shows, anodic oxidation or plasma oxidation is performed on the surface of the Ta film 66, and about a 100 Å to 400 Å $Ta_2O_5$ anodic oxide film 67 is formed (fourth step). By the fourth step, a dielectric layer 68 having a double layer structure, comprised of the Ta film 66 and the anodic oxide film 67, is formed (first dielectric layer). The fourth step corresponds to the step of forming the first dielectric layer. The Ta film 66 may be formed by a CVD method.

Then Cu, which is a conductive metal material, is layered on the surface of the dielectric layer 68 by a plating method, and about a 5.0 to 7.0 µm thick second electrode section 69 (second electrode layer) is formed (fifth step). The second electrode section 69 is formed so as to be superimposed on the wall sections 65a and the bottom face electrode layer 62 via the dielectric layer 68. The fifth step corresponds to the step of forming the second electrode layer.

By this method, the capacitor 1C can be manufactured. According to this capacitor 1C, the surface area of the dielectric layer 68 is increased compared with a flat dielectric layer. Also the wall sections 65a are layered on the top face of the bottom face electrode layer 62, so the surface area can be easily enlarged, which is advantageous to expand the electrostatic capacitance compared with the case of forming trenches. Also the high frequency characteristics can be improved by expanding the electrostatic capacitance. In particular, the capacitor 1C, which has a double layer-structured dielectric layer 68 comprised of the Ta film and $Ta_2O_5$ anodic oxide film formed on the Ta film, can implement a high dielectric constant.

Figure 14:
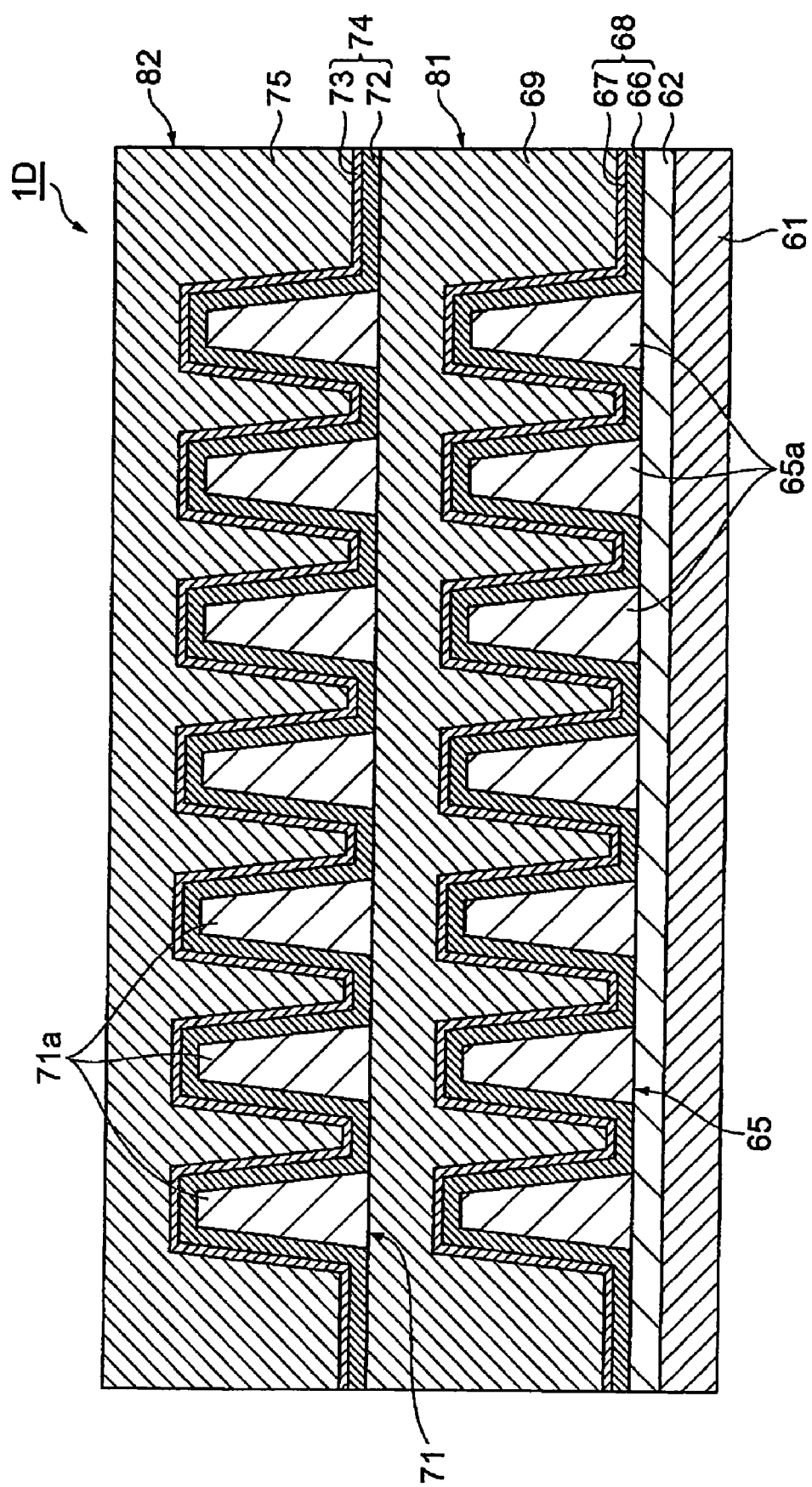
FIG. 14 is a cross-sectional view depicting a capacitor according to the fourth embodiment.

Now a capacitor 1D according to the fourth embodiment will be described with reference to FIG. 14. The capacitor 1D is separated into a bottom layer section 81 and a top layer section 82, and the bottom layer section 81 has a same configuration as the capacitor 1C according to the third embodiment. Therefore for the bottom layer section 81, the composing elements are denoted with a same reference symbols as the capacitor 1C, and description thereof will be omitted. Now the method of manufacturing and the structure of the capacitor 1D will be described.

To manufacture the capacitor 1D, the bottom layer section 81 is formed first by the first to fifth steps, which are the same as the case of manufacturing the capacitor 1C. Then after coating photo resist on the top face of the second electrode section 69 of the bottom layer section 81, patterning is performed using a predetermined photo mask, and a resist pattern for exposing a predetermined shape corresponding to the third electrode section 71 is formed on the top face of the second electrode section 69. Using this resist pattern as a mask, a conductive metal material, such as Cu, is layered on the top face of the second electrode section 69 by a plating method, and the third electrode section 71 is formed (sixth step). In particular, in the sixth step, a plurality of wall sections 71a are formed for forming the convex-concave shape on the third electrode section 71. The wall section 71a corresponds to the second convex section. Then the resist pattern used for forming the third electrode section 71 is removed. Then IBE (Ion Beam Etching) is performed for tapering the plurality of wall sections 71a of the third electrode section 71 (seventh step). The sixth and seventh steps correspond to the step of forming the second convex section.

Then a Ta film 72 is formed on the surface of the plurality of wall sections 71a of the third electrode section 71 and the surface of the second electrode section 69 not covered with the wall sections 71a by an atomic layer method, then anodic oxidation or plasma oxidation is performed on the surface of the Ta film 72, and about a 100 Å to 400 Å $Ta_2O_5$ anodic oxide film 73 is formed (eighth step). By the eighth step, a dielectric layer 74 having a double layer structure, comprised of the Ta film 72 and anodic oxide film 73, is formed (second dielectric layer). The eighth step corresponds to the step of forming the second dielectric layer. The Ta film 72 may be formed by a CVD method.

Then Cu, which is a conductive metal material, is layered on the surface of the dielectric layer 74 by a plating method, and about a 5.0 to 7.0 μm thick fourth electrode section 75 (third electrode layer) is formed (ninth step). The fourth electrode section 75 is formed so as to be superimposed on the wall sections 71a and the second electrode section 69 via the dielectric layer 74. The ninth step corresponds to the step of forming the third electrode layer.

By this method of manufacturing, a capacitor 1D having a double layer structure, comprised of the bottom layer section 81 and the top layer section 82, can be manufactured. According to the capacitor 1D, the dielectric layer 74 is also formed in the top layer section 82, in addition to the dielectric layer 68 in the bottom layer section 81, and the dielectric layer 68 and the dielectric layer 74 can be superimposed, so the electrostatic capacitance can be increased by the multilayer structure of the dielectric layer 68 and the dielectric layer 74.

The capacitor of the present invention was described using examples of capacitors 1A, 1B, 1C and 1D according to the first to fourth embodiments. However the capacitor of the present invention is not limited to these examples. For example, the top layer section 82 of the capacitor 1D may be used instead of the top layer section 32 of the capacitor 1B. The top layer section 32 of the capacitor 1B may be used instead of the top layer section 82 of the capacitor 1D.

(Capacitor Unit)

Figure 15:
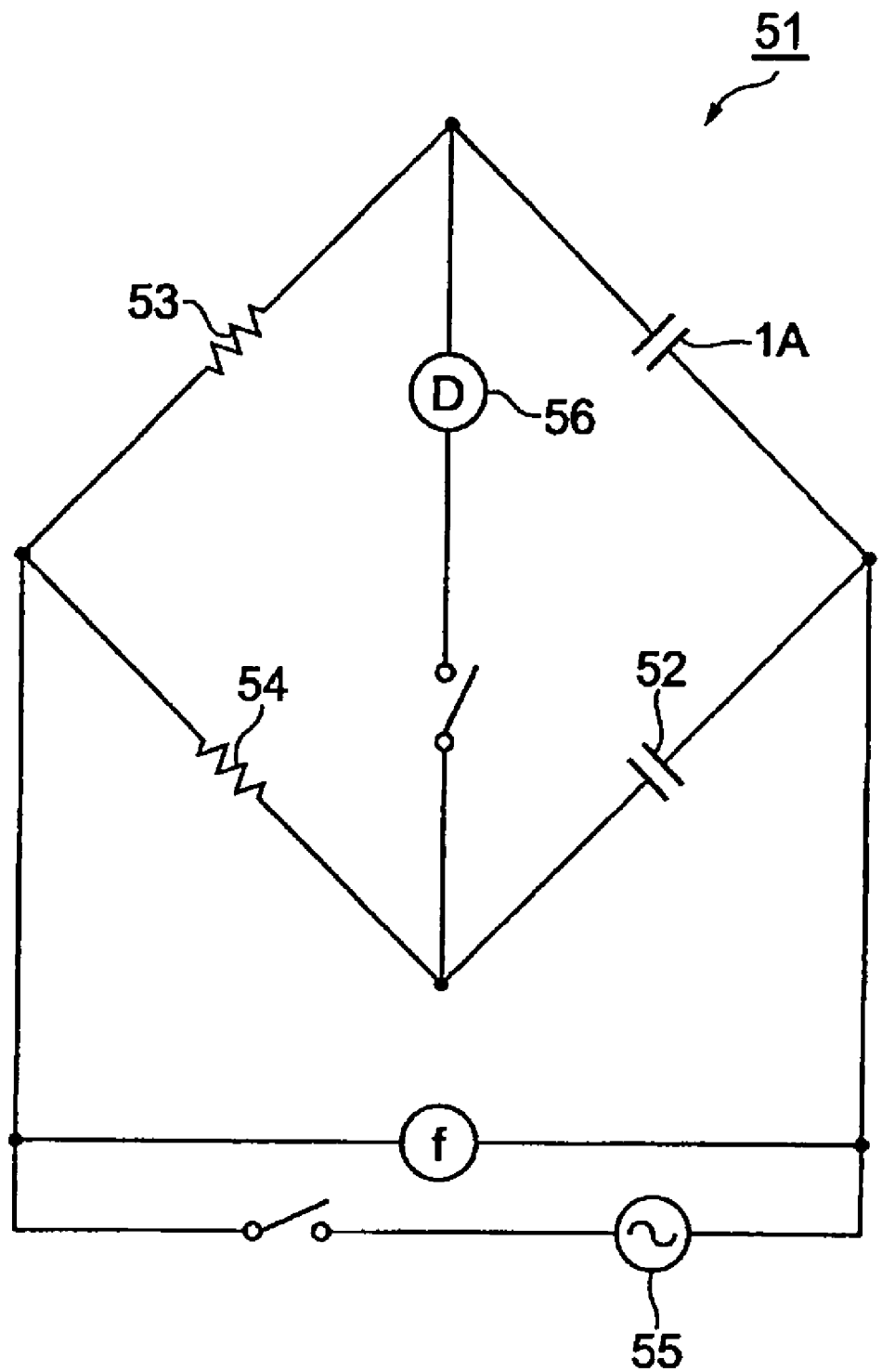
FIG. 15 is a circuit diagram of a capacitor unit according to the present invention, depicting an overview of the capacitance bridge.

Now a capacitor unit will be described with reference to FIG. 15. In the capacitor unit 51, a capacitance bridge is formed using the capacitor 1A of the first embodiment. Furthermore, in the capacitor unit 51, the capacitance bridge may be formed using the capacitor 1B of the second embodiment, capacitor 1C of the third embodiment or capacitor 1D of the fourth embodiment.

The capacitor unit 51 comprises the capacitor 1A, a variable capacitor 52 of which dielectric loss is extremely low and the value of electrostatic capacitance does not change depending on the frequency, a first resistor 53, a second resistor 54, a low frequency transmitter 55, and a digital multi-meter 56, wherein a bridge circuit is constructed by bridge-connecting these composing elements so as to detect the change of electrostatic capacitance of the capacitor 1A, and is used for various sensors.

In this capacitance unit 51, which uses the capacitor 1A, the surface area of the dielectric layer 6 increases compared with a flat dielectric layer. Also the intermediate electrode layer 10, where the wall sections 14a are formed, is formed of a metal material coated on the bottom electrode layer 9, so the surface area can be easily enlarged, which is advantageous to expand the electrostatic capacitance, compared with the case of forming trenches. Also the high frequency characteristics can be maintained since the intermediate layer 10 is formed of a conductive metal material.

It is apparent that various embodiments and modifications of the present invention can be embodied based on the above description. Accordingly, it is possible to carry out the present invention in modes other than the above best mode, within the following scope of claims and scope of equivalents.

What is claimed is:

1. A capacitor, comprising:
    a substrate;
    a first electrode layer formed on the substrate;
    conductive first convex sections layered on a surface of said first electrode layer;
    a first dielectric layer formed on a surface of said first convex sections and a surface of said first electrode layer; and
    a second electrode layer formed by a wet plating method so as to be superimposed on said first convex sections and said first electrode layer via said first dielectric layer, wherein
    the first convex sections have a pectinate form with spacing regions between adjacent first convex sections;
    the first convex sections are separate from the first electrode layer;
    the second layer includes (a) a layered portion formed above the first convex sections such that the first convex sections are sandwiched between the layered portion and the substrate, and (b) portions filling the regions between adjacent first convex sections;
    each of the first convex sections has a tapered shape decreasing in width upwardly from the first electrode layer; and
    each of the portions filling regions between adjacent first convex sections has a tapered shape decreasing in width downwardly toward the first electrode layer.

2. The capacitor according to claim 1, wherein said first dielectric layer is formed of at least one of $Al_2O_3$, $SiO_2$, titanium oxide, SiC, tantalum oxide, hafnium oxide and $BaTiO_3$.

3. The capacitor according to claim 1, wherein said first dielectric layer has a multilayer structure including a Ta film and an anodic oxide film formed on said Ta film.

4. The capacitor according to claim 1, further comprising:
    conductive second convex sections layered on a surface of said second electrode layer;
    a second dielectric layer formed on a surface of said second convex sections and on a surface of said second electrode layer; and
    a third electrode layer formed so as to be superimposed on said second convex sections and said second electrode layer via said second dielectric layer.

5. The capacitor according to claim 4, wherein at least one of said first dielectric layer and said second dielectric layer is formed of at least one of $Al_2O_3$, $SiO_2$, titanium oxide, SiC, tantalum oxide, hafnium oxide and $BaTiO_3$.

6. The capacitor according to claim 4, wherein at least one of said first dielectric layer and said second dielectric layer has a multilayer structure including a Ta film and an anodic oxide film formed on said Ta film.

7. The capacitor according to claim 1, wherein the first convex sections each have a height d2 extending in a direction perpendicular to the surface of the first electrode layer and a width d1 extending in a direction in which end portions of the first convex sections are spaced from each other; and d2>d1.

8. The capacitor according to claim 7, wherein d2 is about 5 μm and d1 is about 1.5 μm.

9. The capacitor according to claim 7, wherein d2>3×d1.

10. A method of manufacturing a capacitor, comprising the steps of:
    forming a substrate;
    forming a first electrode layer on the substrate;
    forming first convex sections by layering a conductive material on a surface of said first electrode layer;
    forming a first dielectric layer by forming an insulation film on a surface of said first convex sections and a surface of said first electrode layer; and
    forming by a wet plating method a second electrode layer by layering a conductive material so as to be superimposed on said first convex sections and said first electrode layer via said first dielectric layer, wherein:

the first convex sections have a pectinate form with spacing regions between adjacent first comment sections;

the first convex sections are separate from the first electrode layer;

the second electrode layer includes (a) a layered portion formed above the first convex sections such that the first convex sections are sandwiched between the layered portion and the substrate, and (b) portions filling the regions between adjacent first convex sections;

each of the first convex sections has a tapered shape decreasing in width upwardly from the first electrode layer; and each of the portions filling regions between adjacent first convex sections has a tapered shape decreasing in width downwardly toward the first electrode layer.

11. The method of manufacturing a capacitor according to claim 10, wherein said insulation film is formed by a CVD method or an atomic layer method in said step of forming said first dielectric layer.

12. The method of manufacturing a capacitor according to claim 10, wherein said insulation film is formed of at least one of $Al_2O_3$, $SiO_2$, titanium oxide, SiC, tantalum oxide, hafnium oxide and $BaTiO_3$.

13. The method of manufacturing a capacitor according to claim 10, wherein, in the step of forming said first dielectric layer, a Ta film is formed on the surface of said first convex sections and the surface of said first electrode layer, and anodic oxidation is performed on the surface of said Ta film.

14. The method of manufacturing a capacitor according to claim 10, further comprising the steps of:

forming second convex sections by layering a conductive material on a surface of said second electrode layer;

forming a second dielectric layer by forming an insulation film on a surface of said second convex sections and a surface of said second electrode layer; and forming a third electrode layer by layering a conductive material so as to be superimposed on said second convex sections and said second electrode layer via said second dielectric layer.

15. The method of manufacturing a capacitor according to claim 14, wherein said insulation film is formed by a CVD method or an atomic layer method in at least one of the step of forming said first dielectric layer and the step of forming said second dielectric layer.

16. The method of manufacturing a capacitor according to claim 14, wherein said insulation film is formed of at least one of $Al_2O_3$, $SiO_2$, titanium oxide, SiC, tantalum oxide, hafnium oxide and $BaTiO_3$.

17. The method of manufacturing a capacitor according to claim 14, wherein, in at least one of the step of forming said first dielectric layer and the step of forming said second dielectric layer, a Ta film is formed on the surface of said first convex sections and the surface of said first electrode layer, and anodic oxidation is performed on the surface of said Ta film.

18. The method of manufacturing a capacitor according to claim 10, wherein the first convex sections each have a height $d2$ extending in a direction perpendicular to the surface of the first electrode layer and a width $d1$ extending in a direction in which end portions of the first convex sections are spaced from each other; and $d2>d1$.

19. The method of manufacturing a capacitor according to claim 18, wherein $d2$ is about 5 μm and $d1$ is about 1.5 μm.

20. The method of manufacturing a capacitor according to claim 18, wherein $d2>3\times d1$.

21. A capacitor unit in which a bridge circuit is fanned using a plurality of capacitors, wherein one capacitor out of said plurality of capacitors comprises:
a substrate;
a first electrode layer formed on the substrate;
conductive first convex sections layered on a surface of said first electrode layer;
a first dielectric layer formed on a surface of said first convex sections and a surface of said first electrode layer; and
a second electrode layer formed by a wet plating method so as to be superimposed on said first convex sections and said first electrode layer via said first dielectric layer, the first convex sections having a pectinate form with spacing regions between adjacent first convex sections and the first convex sections being separate from the first electrode layer, wherein:

the second electrode layer includes (a) a layered portion formed above the first convex sections such that the first convex sections are sandwiched between the layered portion and the substrate, and (b) portions filling the regions between adjacent first convex sections;

each of the first convex sections has a tapered shape decreasing in width upwardly from the first electrode layer; and each of the portions filling regions between adjacent first convex sections has a tapered shape decreasing in width downwardly toward the first electrode layer.

22. The capacitor unit according to claim 21, wherein said first dielectric layer is formed of at least one of $Al_2O_3$, $SiO_2$, titanium oxide, SiC, tantalum oxide, hafnium oxide and $BaTiO_3$.

23. The capacitor unit according to claim 21, wherein said first dielectric layer has a multilayer structure including a Ta film and an anodic oxide film formed on said Ta film.

24. The capacitor unit according to claim 21, wherein
said one capacitor further comprises:
conductive second convex sections layered on a surface of said second electrode layer;
a second dielectric layer formed on a surface of said second convex sections and on a surface of said second electrode layer; and
a third electrode layer formed so as to be superimposed on said second convex sections and said second electrode layer via said second dielectric layer.

25. The capacitor unit according to claim 24, wherein at least one of said first dielectric layer and said second dielectric layer is formed of at least one of $Al_2O_3$, $SiO_2$, titanium oxide, SiC, tantalum oxide, hafnium oxide and $BaTiO_3$.

26. The capacitor unit according to claim 24, wherein at least one of said first dielectric layer and said second dielectric layer has a multilayer structure including a Ta film and an anodic oxide film formed on said Ta film.

27. The capacitor unit according to claim 21, wherein the first convex sections each have a height $d2$ extending in a direction perpendicular to the surface of the first electrode layer and a width $d1$ extending in a direction in which end portions of the first convex sections are spaced from each other; and $d2>d1$.

28. The capacitor unit according to claim 27, wherein $d2$ is about 5 μm and $d1$ is about 1.5 μm.

29. The capacitor unit according to claim 27, wherein $d2>3\times d1$.

* * * * *

UNITED STATES PATENT AND TRADEMARK OFFICE
CERTIFICATE OF CORRECTION

PATENT NO. : 8,085,522 B2  
APPLICATION NO. : 11/819253  
DATED : December 27, 2011  
INVENTOR(S) : Yoshitaka Sasaki et al.

Page 1 of 1

It is certified that error appears in the above-identified patent and that said Letters Patent is hereby corrected as shown below:

On the Title Page

Please delete the following:

Item "(75) Inventors:    Yoshitaka Sasaki, Santa Clara, CA (US); Tatsushi Shimizu, Shatin, N.T. (CA); Takehiro Horinaka, Milpitas, CA (US); Kazuo Ishizaki, Milpitas, CA (US); Shigeki Tanemura, Santa Clara, CA (US)"

And Replace with:

Item (75) Inventors:    Yoshitaka Sasaki, Santa Clara, CA (US); Tatsushi Shimizu, Shatin, N.T. (CN); Takehiro Horinaka, Milpitas, CA (US); Kazuo Ishizaki, Milpitas, CA (US); Shigeki Tanemura, Santa Clara, CA (US)

Signed and Sealed this  
Twenty-second Day of May, 2012

David J. Kappos  
*Director of the United States Patent and Trademark Office*